United States Patent [19]

Steffen

[11] Patent Number: 4,473,735
[45] Date of Patent: Sep. 25, 1984

[54] PROCESS OF DEBURRING A MECHANICAL PIECE

[75] Inventor: Jürg Steffen, Sigriswil, Switzerland

[73] Assignee: Lasag SA, Thun, Switzerland

[21] Appl. No.: 140,884

[22] Filed: Apr. 16, 1980

[30] Foreign Application Priority Data

Apr. 10, 1980 [CH] Switzerland ............... 2749/80

[51] Int. Cl.³ ............................................. B23K 26/00
[52] U.S. Cl. ..................... 219/121 LF; 219/121 LJ; 51/285; 51/323
[58] Field of Search ...... 219/121 L, 121 LE, 121 LF, 219/121 LH, 121 LJ, 121 LM; 51/285, 322, 323; 76/84

[56] References Cited

U.S. PATENT DOCUMENTS

| | | | |
|---|---|---|---|
| 3,448,548 | 6/1969 | Watson | 51/323 X |
| 4,081,655 | 3/1978 | Gale | 219/121 LJ |
| 4,114,018 | 9/1978 | Von Allmen et al. | 219/121 LJ |
| 4,159,686 | 7/1979 | Heim | 219/121 LF X |
| 4,218,494 | 8/1980 | Belmondo et al. | 219/121 LF X |
| 4,250,374 | 2/1981 | Tani | 219/121 LE |

FOREIGN PATENT DOCUMENTS 2713904  10/1978  Fed. Rep. of Germany ...... 219/121 LM

OTHER PUBLICATIONS

*Precision Engineering*, vol. 1, No. 4, Oct. 1979, pp. 189–198; "Deburring Precision Miniature Parts", by L. K. Gillespie.

Primary Examiner—G. Z. Rubinson
Assistant Examiner—Keith E. George
Attorney, Agent, or Firm—Sherman & Shalloway

[57] ABSTRACT

The invention relates to a process and device for deburring mechanical pieces by laser radiation. The device makes it possible to generate a laser beam of determined power Pa. The laser beam is focused in a focusing spot of a diameter $2\omega o$ on the edges of the mechanical piece to be deburred. The focused laser beam causes a volatilization of the burrs of the edge considered: axis $ZZ'$ of the laser beam is approximately concurrent with the edge to be treated and the material is vitrified over a width $\omega o$. To obtain, on the edge, a given angle of sharpening $\alpha$ of a skew surface constituting the edge of a given radius of curvature $R$, the emission power

$$P_a = \frac{2\pi \omega o^2 K(T_v - T_s)}{R\left(1 - \sin\frac{\alpha}{2}\right)}$$

where K represents the heat conductivity coefficient of the material of the pieces and $T_v$ and $T_s$ its vaporization and fusion temperatures respectively. A relative movement of the focusing spot of the laser beam in relation to the edge to be treated is performed at a linear speed $$V_s = \frac{8\omega o H}{R^2\left(1 - \sin\frac{\alpha}{2}\right)^2}\left(\frac{T_v - T_s}{T_v + 273}\right)^2$$

where H represents the thermal diffusivity coefficient of the material. The invention finds application in the removal of the wire edge of sharp instruments.

10 Claims, 22 Drawing Figures

PROCESS OF DEBURRING A MECHANICAL PIECE

This invention relates to a process for deburring particularly of a mechanical piece, the device for using the process and to an instrument such as a surgical instrument obtained by the process.

In the technique relating to machining mechanical pieces, particularly pieces used in microtechnology, the problem of deburring edges is a major problem for obtaining a suitable finish. In the following text, sharp edges and interior angle edges will both be designated by the generic term edge, the sharp edge being constituted by the intersection of two planes or plane surfaces delimiting the shape of an object or instrument, the object or instrument delimited by these two plane surfaces forming at their level a dihedral angle less than 180°, an interior angle edge, on the other hand, being constituted by the intersection of two planes or plane surfaces delimiting the shape of an object or instrument, this object or instrument forming at the level of these surfaces an obtuse dihedral angle greater than 180°, the interior angle edge constituting a groove in the object. Most often the admissible tolerance of burr dimensions, particularly at sharp edges on interior angle edges are very strict and in no case should be greater than the dimensioning tolerances of the final mechanical product or piece. Thus burrs of a length on the order of 5 $\mu$m cannot be accepted when dimensioning tolerances of the pieces are on the order of 2 $\mu$m, in particular, for gas-oil injection nozzles of diesel engines for which the presence of burrs at the end of the injection channels causes a disturbance of the fuel flow conditions and consequently a poor functioning of the engines.

In the same way, in case of mechanical pieces such as cutting instruments, in particular surgical instruments, the presence of burrs on the cutting edge of the instrument does not make it possible, during use of these instruments, to make incisions causing wounds with lips free of any tearing. Further, during an operation, the risk of dirtying a wound by burrs torn off the edge of the instrument is not negligible particularly during an ophthamological microsurgical operation.

Various solutions to the deburring problems have been proposed to reduce as much as possible the existence and size of burrs on the edges of mechanical pieces.

Generally, the type of deburring treatment considered is a function of the outside dimensions of the piece, the admissible degree of finishing of the surface of the piece and the admissible dimension loss. An inventory of these treatments as a function of said parameters was published in the journal "Precision Engineering," volume 1, No. 4, October 1979, pp 189-198.

Figure 1:
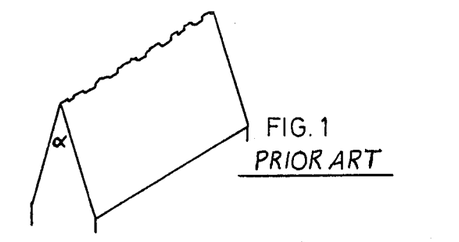

However, these treatments are burdensome and particularly in the case of pieces such as injection nozzles for diesel engines, can contribute more than 30% to the cost of the finished piece, the deburring having to be done manually by the piece. In the case of deburring surgical instruments and more particularly removal of the wire edge from surgical instruments, the process widely used now consists of a treatment of the electrochemical type. As shown in FIG. 1, the edge of the instrument comprises a series of wavy roughnesses coming from grinding of the instrument and can amount to 7 to 8 $\mu$m for which electrochemical treatment is unsatisfactory considering the point effect on the electric field inherent in the very shape of the instrument.

The process according to the invention makes is possible to remedy said drawbacks and has for its object a process of deburring mechanical pieces comprising sharp edges by means of an entirely automatic device.

Another object of this invention is a process for deburring mechanical pieces totally independent of the shape of the piece.

Another object of this invention is a process for deburring a mechanical piece, particularly a cutting instrument, making possible a local treatment of each sharp edge of the instrument for a precise sharpening and a hardening of the edge of this instrument for minimal wear.

According to the process, object of the invention, a laser beam with a power density between $10^6$ and $10^8$ W/cm$^2$ is focused on the sharp edge of the piece after machining of the latter to cause a fusion and volatilization of the burrs on the edge. A relative movement at a determined movement speed of the focusing spot of the laser beam and sharp edges of the piece over the totality of these latter makes it possible to treat the totality of this piece.

The device making possible the use of the process according to the invention particularly comprises means generating a laser beam, means for focusing the laser beam on the sharp edges of the mechanical piece and means to assure the relative movement on the sharp edges of the mechanical piece of the focusing spot of the laser beam at a determined rate of movement.

The process according to the invention makes it possible, in particular, to obtain sharp instruments of determined sharpening angle $\alpha$, the edge of the instrument being made up of a skew surface with fairly uniform radius of curvature R, the zone underlying the edge comprising, on the instrument wall, a strip of vitrified material of dimension $\omega o$ along a first direction parallel to a generatrix of the instrument wall and with thickness Zs in a second direction perpendicular to this first direction. The radius of curvature of the skew surface constituting the edge is of the form $$R = Zs \frac{1}{1 - \sin \frac{\alpha}{2}}.$$

The strip of vitrified material and the skew surface constituting the edge exhibiting a roughness less than 5 $\mu$m.

The invention can be used for any operation of deburring or wire edge removal of mechanical pieces or instruments of material such as metals, special steels, alloys, glass, obsidian, ceramic, corundum, fritted metals.

The invention will be better understood from the following description and drawings where the relative size and proportions have not been respected to assure a better understanding and wherein further FIG. 1 relates to the prior art, FIGS. 2a, 2b, 2c, 2d, 2e, 2f, 2g relate to a process according to the invention and to different parameters of the stages of this process, FIGS. 3a and 3b relate to a process of making cutting instruments of the surgical instrument type making possible a removal of the wire edge from the edge of the instrument according to the invention.

According to FIG. 2, the process of deburring a mechanical piece according to the invention consists, after machining of the piece thereby comprising sharp edges or interior angle edges, of focusing on these edges of the piece a laser beam 100 with a power density between $10^6$ and $10^8$ W/cm$^2$. The laser beam makes it possible to cause at the focusing point a fusion and volatilization of the burr of the edge. A relative movement of the focusing spot of the laser beam and the edges of the piece is assured over the totality of the edges at a determined rate of movement. Laser beam 100 has an intensity distribution Ia as a function of distance d from axis ZZ' of beam that is fairly uniform, the maximal intensity of the beam being distributed in the vicinity of the axis.

Figure 2A:
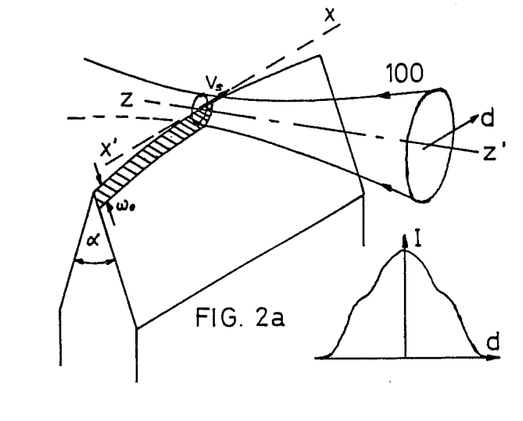
Figure 2B:
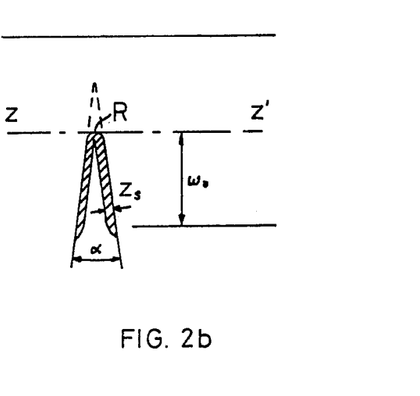

As shown in a non-limiting way in FIG. 2a, the process according to the invention is particularly suited to removal of the wire edge from cutting or sharp instruments. The process according to the invention consists, for removal of the wire edge from these instruments after sharpening of the latter at a determined sharpening angle α to constitute the cutting edge or instrument edge, of focusing said laser beam on the sharp part of the instrument. Preferably, to obtain as homogeneous treatment as possible along the entire length of the edge, the axis of laser beam ZZ' and the tangent to the instrument edge indicated in FIG. 2a by direction x'x are approximately concurrent. The focusing spot of laser beam 100 is moved out the totality of the instrument edge to assure fusion of the wire edge in the central zone of the focusing spot of the laser beam, axis ZZ' of the laser beam and the tangent to the edge x'x of the instrument being kept approximately concurrent during this movement. Movement of the focusing spot further makes possible a vitrification of the surface zones underlying the instrument edge. The high-power intensity and the rate of movement of the spot on the instrument edge makes possible a rapid cooling of the fused surface layers after impact of the laser beam, this cooling giving rise to a phenomenon similar to that of tempering for metals. Temperature gradients on the order of $5 \times 10^{8\circ}$ C./s are possible in steel, for example. The surface layers and edge thereby exhibit a vitrified appearance and a hardness in a ratio of 1 to 3, for a given material, in relation to the instrument not subjected to treatment. The process according to the invention also makes it possible to control the final shape of the edge of the instrument or piece to be treated by controlled deformation of the fused wire edge because of the surface tension of the fused material. As shown in FIG. 2b for a sharp instrument comprising a determined sharpening angle α, vitrification of a strip of material on the surface zones underlying the edge of dimension ωo in a first direction parallel to a generatrix of the instrument wall and of predetermined thickness Zs in a second direction perpendicular to this first direction makes possible the formation of a cutting edge made up approximately of a skew surface with radius of curvature R, in a cross section of the edge, fairly equal to $$R = Zs \frac{1}{1 - \sin \frac{\alpha}{2}}.$$

because of the geometric parameters of the instrument and the deformation of the fused material under the action of the surface tension of the fused material. The deformation of this material continues until the formation of a form of equilibrium whose surface of separation from the outside medium, made up of a skew surface or radious of curvature R fairly uniform in cross section, forms the edge of the instrument. In case of a blade, the skew surface is made up of a semicylindrical surface, in case of a cylindrical needle the skew surface constituting the sharp edge is made up of a spherical cap of radius of curvature R. To obtain jointly the vitrification of the zones underlying the edge in a dimension ωo along a generatrix of the instrument wall and on a thickness Zs, the focusing spot of the laser beam has a diameter D=2ωo and the laser ray is emitted with a candlepower $$Pa = \frac{2\pi \omega o^2 K(Tv - Ts)}{R\left(1 - \sin \frac{\alpha}{2}\right)} \quad \text{(I)}$$

in which candlepower Pa is expressed in watts, ωo, R, Zs are expressed in centimeters and where K represents the thermal conductivity coefficient of the material constituting the instrument expressed in W/cm×°C.

Tv and Ts respectively represent the vaporization temperature and fusion temperature of the material constituting the instrument expressed in degrees centigrade.

Correlatively, the relative movement of the laser beam spot is performed at a linear rate Vs=2 ωo/T where T represents for each point of the edge to be treated the duration of the influence of the laser beam.

$$Vs = \frac{8\omega o\, H}{\pi R^2 \left(1 - \sin \frac{\alpha}{2}\right)^2} \left(\frac{Tv - Ts}{Tv + 273}\right)^2 \quad \text{(II)}$$

$$\text{with } T = \frac{\pi R^2}{4H}\left(1 - \sin \frac{\alpha}{2}\right)^2 \left(\frac{Tv + 273}{Tv - Ts}\right)^2$$

where H represents the thermal diffusivity coefficient of the material constituting the instrument expressed in square centimeters per second.

The process according to the invention makes possible the formation of a single uniform surface formed by the skew surface constituting the instruments edge and by the strip of vitrified material, each wall being subjected successively to the impact of the laser beam, the uniform single surface constituting for the instrument a cutting zone with typical roughness close to 1 μm in continuous emission, for example.

FIGS. 2c to 2g relate to different examples of embodiment of the process according to the invention, considering the laser emission parameters.

Figure 2C:
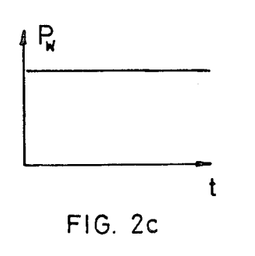

According to FIG. 2c, the laser radiation is continuously emitted with a candlepower Pa determined according to (I). For a steel instrument with a sharpening angle $\alpha=150$, the edge length $L-1$ cm and radius of curvature $R=1$ μm and of width $\omega o=15$ μm that are desired, the power density of the focusing spot $Ia = Pa/\rho\omega o^2$ is 1.4 $10^7$ W/cm$^2$, the candlepower $Pa=100$ W and the speed $Vs=100$ m/s. The duration of treatment $\tau=L/Vs=0.1$ ms. According to FIG. 2d, the continuous laser emission is modulated by pulses with a frequency modulation on the order of 300 kHs. The pulse power is on the order of $Pa=100$ W, each pulse has a duration on the order of 0.3 μs and an energy on the order of 30 μJ. The average radiated power is about 9 W and the rate of relative movement of the focusing spot is about 9 m/s.

Figure 2D:
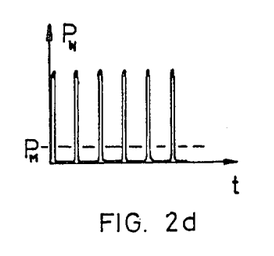
Figure 2E:
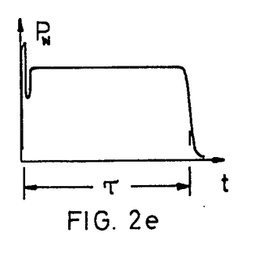

According to a variant of the laser emission parameters shown in FIG. 2e, the laser emission is a pulsed emission with candlepower Pa, for example, equal to 100 watts. Each laser pulse has a duration $\tau$ fairly equal to the ratio $\tau=L/Vs$ of total length L of the instrument edge to linear rate of movement of the focusing spot on this edge. The energy of each pulse is equal to the product $Pa \times \tau$.

Figure 2F:
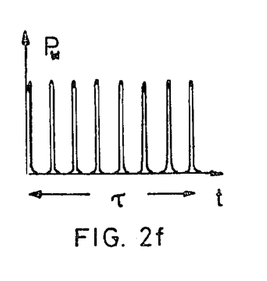

Each laser pulse can, as shown in FIG. 2f, also be modulated at a frequency modulation close to 300 kHz as already shown in FIG. 2d.

Figure 2G:
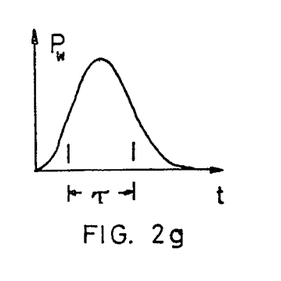

According to a variant suited to treatment of sharp instruments of the needle type, shown in FIG. 2g, the laser emission consists of a peak power pulse Pa determined according to (I) and of duration $$\tau = \frac{\pi R^2}{4H}\left(1 - \sin\frac{\alpha}{2}\right)^2 \left(\frac{Tv + 273}{Tv - Ts}\right)^2 \quad (III)$$

the resulting energy Ea is equal to the product $Pa \times \tau$. For the example of a steel needle of angle $\alpha=15°$, for a radius of curvature $R=1$ μm and treatment width $\omega o=15$ μm which are desired, the power density $Ia=1.4 \ 10^7$ W/cm$^2$ and power $Pa=100$ W, the pulse duration $\tau=0.3$ μs. The focusing spot is kept on the needle point for the total duration of the pulse.

Figures 3A, 3B:
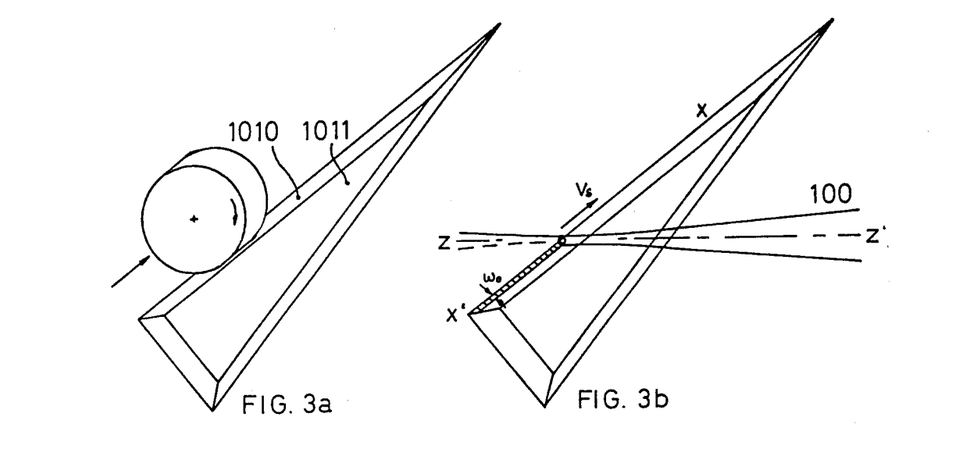

The process according to the invention makes possible the treatment of mechanical pieces or instruments made of nonmetallic or metallic materials. This process is well suited to making razor blades, sharp surgical instruments such as bistouris, cardiovascular surgical needles, ophthalmic microsurgical needles, dental surgery needles or instruments. According to the process of the invention, manufacture of a sharp surgical instrument consists of starting with a special steel rod, particularly steel 455, 302, 304 and 420 exhibiting good mechanical and thermal characteristics for fusion by laser, grinding the steel rod to form a polyhedral solid comprising a plurality of faces. In FIG. 3a, the two-by-two intersection of these faces 1010, 1011 forms a determined sharp angle of sharpening $\alpha$ along a plane continuous line of determined curvature. The group of sharp edges of the polyhedral solid constitutes, after sharpening, the edge of the instrument. Typically, the edge of these instruments comprises burrs that can amount to 15 to 20 μm. These burrs cannot easily be reduced by said processes, the various treatments used so far making possible only an imperfect reduction to 7 to 8 μm, while most often causing an overall treatment of the piece or instrument which has the effect of making the latter unit brittle. The dangers of breaking of the standard surgical instruments of the needle type are therefore not small.

According to the invention, the polyhedral solid unit is subjected to a gentle surface treatment permitting a fine polishing of the group of faces of the polyhedral solid. Typically, the surface treatment is constituted by an anode polishing.

A laser beam 100 of power density Ia between $10^6$ and $10^8$ W/cm$^2$ is then focused on at least a point of the sharp edges of the polyhedral solid. The axis of the laser beam of maximal intensity and the tangent to the curve of the sharp edge are approximately concurrent. The focusing point is then moved over the totality of the instrument edge, the axis of the laser beam and the tangent to the curve being kept approximately concurrent during movement to cause the fusion of the wire edge in the central zone of the laser beam and a fusion of the surface zones underlying the edge. The laser beam is focused in a spot $2\omega o$ in diameter permitting a vitrification of a surface zone of the material of the instrument of dimension $\omega o$ in a direction parallel to a generatrix G of the instrument wall and of thickness Zs in a second direction perpendicular to the first direction. The laser beam causes the fusion of the wire edge and the formation of a cutting edge made up of a skew surface with radius of curvature, in a cross section, equal to $$R = Zs \frac{1}{1 - \sin\frac{\alpha}{2}},$$

this laser radiation being emitted with a candlepower given according to relation (I) described above. Jointly, the movement of the focusing spot is performed at a linear speed Vs given by equation (II) above.

Preferably, the laser emission is performed in TEMoo mode, the radiation intensity as a function of the distance from the axis of the beam being distributed approximately according to a Gauss curve.

This distribution advantageously makes possible a volatilization of the burrs and a fusion of the zones underlying the sharp edges.

Figures 4A, 4B:
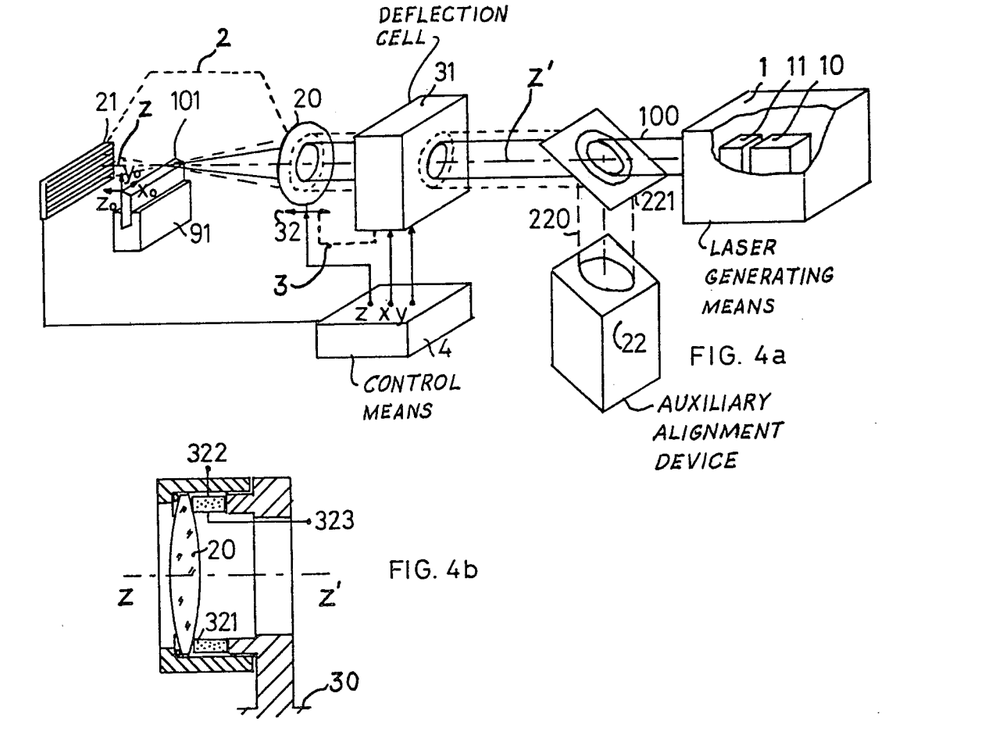
FIGS. 4a to 4d represent a device for using the process and details of embodiment of this device according to the invention.

FIG. 4a relates to a non-limiting embodiment of a device making possible the use of the process according to the invention. According to FIG. 4a, this device comprises means 1 to generate laser beam 100. These means 1 comprise, for example, a laser emission head 10 emitting a beam 100 of average power density Pa (relation I). Laser emission head 10 can be a continuous laser emission head and comprise, for example, a $CO_2$ gas or argon laser or an Nd.YAG solid body laser. The means for generating the laser radiation further comprise, according to a first variant embodiment shown in FIG. 4a, means 11 for modulation of the laser emission by pulses at a frequency close to 300 kHz. Each pulse has a duration on the order of 0.3 μs. The power and energy of the pulses are determined according to equations (I) and (III), energy $Ea=Pa \times \tau$. For a more detailed description of this type of emission heads, consult particularly U.S. Pat. No. 4,150,343 in the name of the applicant. According to another variant embodiment laser emission head 10 permits a pulsed laser emission of power Pa. Each laser pulse has a duration $\tau$ approximately equal to the ratio $\tau=L/Vs$ of the length of the instrument to be treated to the linear speed Vs of movement of the focusing spot on this edge. The energy of each pulse is typically equal to the product $Pa \times \tau$. Modulation means 11 possibly also make possible a modulation of the laser pulses at a modulation frequency close to 300 kHz. According to a non-limiting variant of the device making possible the treatment of a sharp instrument of the needle type of circular section, the pulsed laser emission head can generate a simple pulse of energy and duration determined according to the required parameters R and ωo. According to a preferred variant of the device according to the invention, the laser emission head emits a laser beam in the TEMoo mode. The intensity distribution of the beam as a function of the distance from the axis of this latter is approximately distributed along a Gauss curve and permits a vitrification of the surface zones underlying the edge according to thickness Zs decreasing regularly as a function of the distance from the instrument edge. For a more detailed description of these emission heads, in particular emission heads comprising an Nd YAG solid body laser, see U.S. patent application Ser. No. 552,998 in the name of the applicant.

The device according to the invention represented in FIG. 4a further comprises means 2 for focusing of the laser beam on the edges, sharp edges or grooves of mechanical piece 101. In FIG. 4a, the focusing means 2 are represented by a mixed line 2 a functional link between converging lens 20 assuring the focusing of laser beam 100 and detector 21 placed in the axis of the beam and making possible the control of the effective focusing of of the focusing spot on the edge to be treated under conditions described above. The focal length F of this lens is given by (IV): $F=\omega o/\theta$ according to the requirements of the diameter of the focusing spot where $\theta$ is the divergence of the beam, is on the order of 0.2 to $2 \cdot 10^{-3}$ for a YAG laser and 0.8 to $8 \cdot 10^{-3}$ for a $CO_2$ laser. According to FIG. 4a, detector 21 placed downstream from the focusing spot of the laser beam on the axis of this beam and delivers, for a suitable focusing of the spot on the edge, a reference signal representing the coincidence at intersection of axis ZZ' of the laser beam and tangent to the curve of the edge.

The device according to the invention represented in FIG. 4a further comprises means 3 to assure a relative movement of the focusing spot at a determined rate on the edges of the mechanical piece.

In FIG. 4a, means 3 to assure the relative movement of the spot and edges have been represented by a mixed line 4, a functional link between a deflection cell 31 at x, y of the laser beam, directions x and y being represented in FIG. 4a as directions parallel to the tangent to the edge of the instrument 101 and perpendicular to this direction respectively, and means 32 for movement in direction 2 parallel to axis ZZ' of the laser beam. Directions x, y, z form a reference trihedron. These movement means 32 are represented in FIG. 4a by a double arrow and are made up, for example, of any means for driving and moving in translation, in direction z, of focusing lens 20 made up of a zoom type lens, mounted on a carriage mobile in this direction and driven by a driving motor. Cell 20 for deflection at x, y, is by way of non-limiting example, made up of an electrooptical deflection cell or a set of mobile mirrors of the galvanometer type mirrors. The laser beam deflection means, thus described in a non-limiting manner, make possible the movement of the focusing spot over the totality of the instrument edge at a determined rate of movement.

The device according to the invention also comprises means 4 to control the movement of the focusing spot by a predetermined law of movement corresponding to the law of curvature of the sharp part of the instrument. According to FIG. 4a, instrument 101 is placed on an instrument-carrying support 91. It should be noted that almost the totality of the sharp instruments, such as surgical instruments, obtained by grinding a metal rod exhibit sharp edges made up of plane continuous curves. The orientation of each edge to be treated along a plane x, y merged with the focal plane of the focusing lens 20 is therefore made up by the sole orientation of the instrument-carrying support. In this case, the movement of the focusing spot is reduced to a movement in the focusing plane, plane x, y, lens 20 preferably being selected with a large focal length, on the order of 10 cm, so that, considering the small dimensions of the objects to be treated, the focusing of the beam is done without aberrations under Gauss conditions. In the case of deburring any mechanical pieces, the means for deflecting the laser beam assure, however, focusing of this latter on the skew curve constituting the edge to be treated. A particular case relates to mechanical pieces such as reaming drills or taps exhibiting an axial symmetry of revolution on which is superposed a periodic configuration spatially constituted by the drilling or reaming edge. In this case, the laser beam focusing spot is kept focused at a fixed point of the periodic configuration to be treated, a helicoidal movement being approximately imparted to the piece by piece-holder support 91 made up, for example, of a lathe with a carriage mobile at x. In case these pieces with particular geometry have a variable cross section, the deflection of the laser beam is reduced to a plane deflection (x, y) along the plane curve formed by the intersection of the lateral surface of the piece and an axial plane such as the focal plane (x, y) of the lens.

As represented in FIG. 4a, the means for focusing the laser beam further comprise a device for sighting the edge or sharp part of the instrument comprising an auxiliary alignment device 22 emitting an alignment beam 220 and a semitransparent mirror 221 allowing the joint transmission of the treatment laser beam 100 and alignment beam 220, the two beams having their axes merged and identical optical paths downstream from mirror 221. The semitransparent mirror is placed between deflection cell 31 and emission means 1, deflection cell 31 and focusing beam 20 assuring respectively the transmission and focusing of the laser beam and alignment beam approximately identically. Preferably, the auxiliary alignment device 22 is made up of an He Ne laser emitting a beam 220 of greater diameter than that of laser beam 100 to assure a complete covering of the focusing spot of laser beam 100 by the alignment beam spot.

After focusing of the spot at an initial point of the edge $x_o, y_o, z_o$ determined by the sighting device, control means 4 make it possible to deliver to deflection means 3 and mainly to deflection cell 31 and to means 30 for moving the focusing spot in direction z, signals x (t), y (t), z (t) of movement of the spot according to the law of curvature f (x, y, z) in relation to a fixed frame of reference $(x_o, y_o, z_o)$ of the edge of the piece to be treated. Of course, signals x (t), y (t) z (t) are determined by the type of piece to be treated considering the parameters of initial positioning of the instrument or piece 101 on the instrument-carrying support 91.

Any embodiment in which, on the one hand, the group of signals x (t), y (t), z (t) or, on the other hand, only a part of these signals, for example, signals x (t), y (t) are delivered to a motor driving the instrument-carrying support 91, signal z (t) being kept constant or simply eliminated, does not go outside the scope of this invention as described above.

The overall functioning of the apparatus according to the invention represented in FIG. 4a is the following: alignment beam 220 makes possible adjustment of the focusing point of focusing lens 20 by a system of coordinates $x_o$, $y_o$, $z_o$ and then of treatment laser beam 100. Detection of the focusing point is performed by detector 21 which delivers a reference signal to control means 4 during suitable focusing of the alignment beam, therefore of the treatment laser beam. The reference signal acts, for example, by control means 4 on deflection cell 31 and more precisely at the deflection at y to cause at $x_o$, $y_o$, $z_o$ at the beginning the coincidence, at intersection, of axis ZZ' of the beam. After stabilization of the system, the time constant of the system can be selected much below 1/1000 second, control means 4 deliver signals x (t), y (t), z (t) to deflection means 3 in a sequence determined for a type of instrument or piece, causing the movement of the focusing point of the spots of alignment beam 220 and of treatment beam 100 according to the law of curvature of the edge of the instrument 101. For complex instrument shapes, several treatment sequences may be necessary. In any case, the apparatus according to the invention makes possible treatment of a number of surgical needle type pieces that can amount to 150 pieces a minute.

According to a detail of embodiment of the invention represented in FIG. 4b, means 32 for moving the focusing spot of the laser beam in direction 3 are made up of a piezoelectric quartz ring 321 solid with the frame or optical bench 30 of the device. Piezoelectric quartz ring 321 acts as a support for lens 20, both having their axes merged with axis ZZ' of laser beam 100. Piezoelectric quartz ring 321 comprises electrodes 322 and 323 to which a control voltage can be applied. A direct control voltage applied to electrodes 321, 322 makes it possible to obtain a proportional movement in direction ZZ' of lens 20 and of the focusing point. This device makes possible either the control of movement of the focusing spot in direction ZZ' for slight movements on the order of some hundredth of a millimeter or servocontrol of focusing of the spot in direction Z by control of focusing deficiencies by detector 21 in this direction.

Figure 4C:
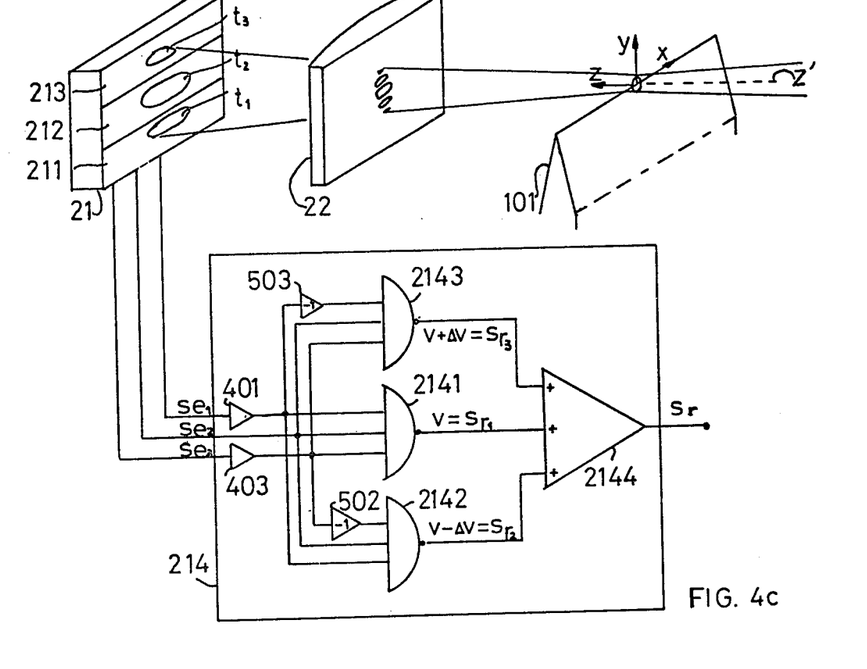

According to another detail of embodiment of the invention shown in FIG. 4c, detector 21 is made up, in a direction parallel to direction y, of a network of photodiodes 211, 212, 213. The detector comprises, for example, at least three photodiodes in a non-limiting manner. Each photodiode delivers respectively for each diffraction spot $t_1$, $t_2$, $t_3$ of the alignment beam and/or the treatment laser beam delivered by the edge of the instrument to be treated an elementary signal $Se_1$, $Se_2$, $Se_3$ of determined amplitude for a suitable focusing of the laser beam spot. The group of elementary signals makes it possible to constitute reference signal Sr. For this purpose, a logic circuit 214 delivers reference signal Sr in the presence of the group of elementary signals $Se_1$, $Se_2$, $Se_3$, therefore of diffraction spots on photodiodes 211, 212, 213. By way of non-limiting example, logic circuit 214 comprises at least three AND logic gates 2141, 2142, 2143, each receiving elementary signals $Se_1$, $Se_2$, $Se_3$. One of these AND gates, gate 2141, for example, receives signals $Se_1$ and $Se_3$ through a maximum threshold comparator 401 and a minimum threshold comparator 403 signal $Se_2$ being delivered directly to gate 2141. Gate 2142 receives the signal delivered by minimum threhold comparator 403 through a logic invertor 502, signal $Se_2$ and the signal delivered by maximum threshold comparator 401. AND gate 2143 receives signal $Se_2$ and the signal delivered by the maximum threshold comparator 401. AND gate 2143 receives signal $Se_2$, the signal delivered by maximum threshold comparator 401 through a logic invertor 503 and the signal delivered by minimum threshold comparator 403. AND gate 2141, 2142 and 2143 have their output connection to the input of a summing amplifier 2144.

The functioning of the device shown in FIG. 4c is the following: In the presence of a suitable focusing of the laser spot, i.e., during intersection of tangent x to the instrument edge and axis ZZ' of the beam, diffraction spots $t_1$, $t_2$, $t_3$ of intensity $I_1$, $I_2$, $I_3$ coincide exactly with diodes 211, 212 and 213 which deliver a signal $Se_1$, $Se_2$, $Se_3$ respectively. The thresholds of maximum comparator 401 and minimum comparator 403 are such that the signals delivered by these comparators in the presence of signals $Se_1$ and $Se_3$ have a logic level 1, the amplitude of signal $Se_2$ being able to be taken, for example, as reference logic level 1. AND gate 2141 delivers a logic signal of logic level 1, $Sr\hat{1} = Se\hat{1} \times Se\hat{2} \times Se\hat{3}$. This signal $Sr\hat{1}$ of logic level 1 typically has a given amplitude $Sr_1 = V$ representative of the suitable focusing of the beam. Gates 2141 and 2143 are then fed by signal $Se\hat{2}$ of logic level 1 and by logic inverter 502 and 503 respectively made up, for example, of bistable flip-flops, which deliver logic signals of level 0 to said two gates. Gates 2142 and 2143 deliver a logic signal $Sr\hat{2} = Se\hat{1} \times \overline{Se\hat{2}} \times Se\hat{3}$ and $Sr\hat{3} = \overline{Se\hat{1}} \times Se\hat{2} \times Se\hat{3}$ of logic level 0. Preferably, the amplitude of the signal of logic level 0 delivered by gates 2142 and 2143 can be selected as being equal to the reference voltage of the device by any correction circuit well known to a man of the art and which therefore will not be described here. Summing amplifier 2144 delivers signal $Sr = Sr_1 = V$ at the time of suitable focusing of the spot.

During a defective focusing of the spot, for example, toward negative y's, a defocusing $-\Delta y$ of the spot results in the delivery by photodiode 213 of a signal of amplitude $Se_3 - \Delta s$ lower than the threshold of minimum comparator 403, which, being triggered, delivers a signal $Se\hat{3}$ of logic level 0. The amplitude of signal $Se\hat{1}$, however, remains enough not to cause triggering of maximum comparator 401, this comparator in this case delivering logic signal $\overline{Se\hat{1}}$. AND gates 2141 and 2143 receiving this signal deliver a logic signal $Sr\hat{1} = \overline{Se\hat{1}} \times Se\hat{2} \times \overline{Se\hat{3}}$ and $Sr\hat{3} = \overline{Se\hat{1}} \times Se\hat{2} \times \overline{Se\hat{3}}$ of logic level 0 regardless of the slighter amplitude of signal $Se_1$. AND gate 2142 receiving the signal $Se_3$ reestablished by logic inverter 502 delivers a logic signal $Sr\hat{2} = Se\hat{1} \times \overline{Se\hat{2}} \times Se\hat{3}$ of logic level 1. The amplitude of this logic signal delivered by gate 2142 can be selected, for example, equal to $Sr_2 = V - \Delta V$ where $\Delta V$ represents the maximum resolution increment $\Delta y$ acceptable for the focusing spot, summing amplifier 2144 deliverying an amplitude signal $Sr = Sr_2 = V - \Delta V$. In case of a defective focusing of the focusing spot toward positive y's, a defocusing $+\Delta y$ of the spot results in the delivery by photodiode 211 of a signal $Se_1 + \Delta s$ greater than the threshold of maximum comparator 401 which, being triggered, delivers a signal $Se\hat{1}$ of logic level 0. The greater amplitude of signal $Se_3$ does not cause the triggering of minimum comparator 403, which delivers signal $Se\hat{3}$. AND gate 2143 receiving logic signal $Se\hat{1}$, reestablished by logic inverter 503 delivers a logic signal $Sr\hat{2} = \overline{Se\hat{1}} \times Se\hat{2} \times Se\hat{3}$ of logic level 1. The amplitude of this logic signal delivered by gate 2143 can be selected, for example, equal to $Sr_3 = V + \Delta V$ where $\Delta V$ represents the maximum resolution increment $\Delta y$ acceptable for the focusing spot. Summing amplifier 2144 delivers an amplitude signal $Sr_3 = V + \Delta V$, gates 2141 and 2142 delivering a logic signal S 21 and S 22 respectively of logic level 0 for which the amplitude was selected as zero as described above.

Figure 4D:
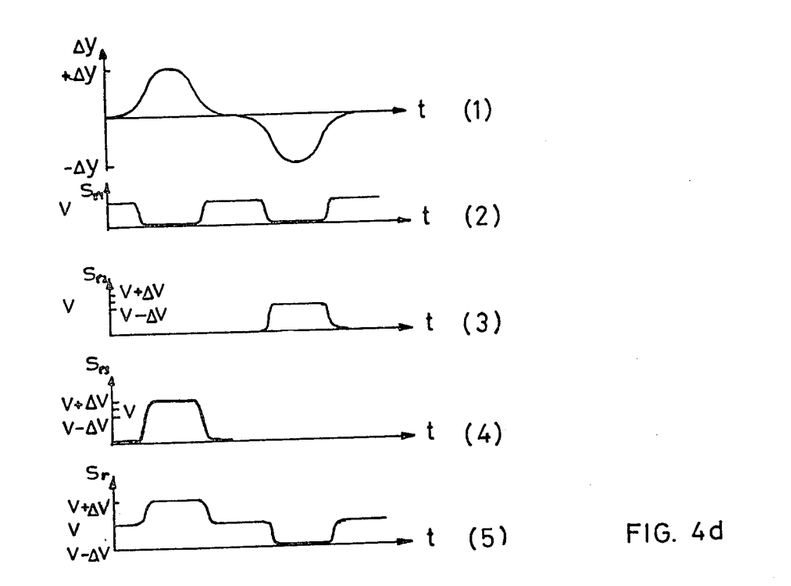

The various signals delivered below for a defocusing $\pm \Delta y$ are represented in FIGS. 4d1 to 4d5 as described above. Such a detection system makes it possible to be independent to the maximum of the spatial resolution of the network of diodes in direction y, the increment of the resolution of detection circuitry $\Delta V$ being made minimal, considering the gain of the circuitry opening which can arbitrarily be selected great.

Preferably detector 21 in direction x has a dimension approximately identical with that of the instrument to be treated. For instruments of large size in this direction, on the order of half the focal distance of converging lens 20, a semicylindrical convergent lens 22 makes possible focusing of the diffraction spots on the detector regardless of the position of the spot of the laser beam during its movement. Any embodiment in which the diode network is replaced by a vidicon tube does not go outside the scope of the invention.

Figure 5:
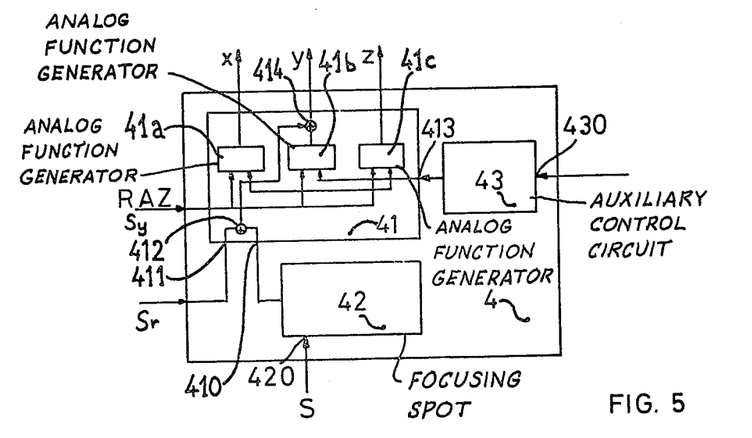
FIG. 5 represents another detail of embodiment of the device represented in FIG. 4a, FIGS. 6a to 6c represents a variant embodiment of the device according to the invention represented in FIG. 4a, FIGS. 7a to 7d represent various types of sharp instruments obtained by the process according to the invention.

According to a detail of embodiment shown in FIG. 5, means 4 for controlling the movement of the focusing spot comprise a function generator 41 delivering respectively a signal x (t) and y (t) at the inputs for control of deviation at x and at y of deflection cell 31 and a signal z (t) at the input of system 32 for control of the movement at Z of focusing lens 20. Signals x (t), y (t), z (t) are on parametric coordinates, time functions representing, at each instant, for a sequence relating to an instrument, the law of curvature of the edge or sharp point of the instrument. The function generator is, for example, made up of three analog function generators 41a, 41b, 41c, synchronized by a signal Sy delivering respectively signals x (t), y (t), z (t) for a treatment sequence. A current for automatic prepositioning of focusing spot 42 delivers to function generator 41 at a first input 410, called the control input, a signal for prepositioning of the focusing spot. Function generator 41 receives at a second input 411, called the correction input, reference signal Sr delivered by the laser radiation detector mainly by logic circuit 214. The prepositioning signal, for example, has an amplitude equal to V and the difference between the amplitude of reference signal $V \pm \Delta V$ and the amplitude of the prepositioning signal performed by a summing element 412 is, for example, added at 414 to the signal delivered by the analog function generator applied at the inputs for control of deflection in direction y. Focusing of the laser beam spot in direction y is thus a slave to the curvature of the instrument edge to be treated by the detection circuitry made up of detector 21, logic circuit 214, control circuit 4 and deflection cell 31.

According to a preferred embodiment of the invention shown in FIG. 5, control means 4 further comprise an auxiliary circuit 43 for control of the rate of movement of the focusing spot. Auxiliary control circuit 43 delivers to function generator 41 at a third input a signal adjustable by the operator, a signal of the form $x'^2 + y'^2 + z'^2 = Q$; (IV) where Q is approximately equal to Vs the linear rate of movement of the spot over the edge and in which x', y', z' represent first derivatives in relation to time dx/dt, dy/dt, dz/dt, of signals x (t), y (t), z (t).

By way of non-limiting example, each analog function generator respectively receives signal x', y', z', the auxiliary circuit imposing said relation (IV). In this case, said analog generators are made up of integrators provided with a common zero resetting making their synchronization Sy possible, the auxiliary control circuit consisting, for example, of a programmable calculator and an analog numerical converter. These devices will not be described because they are well known to a man of the art.

Figure 6A:
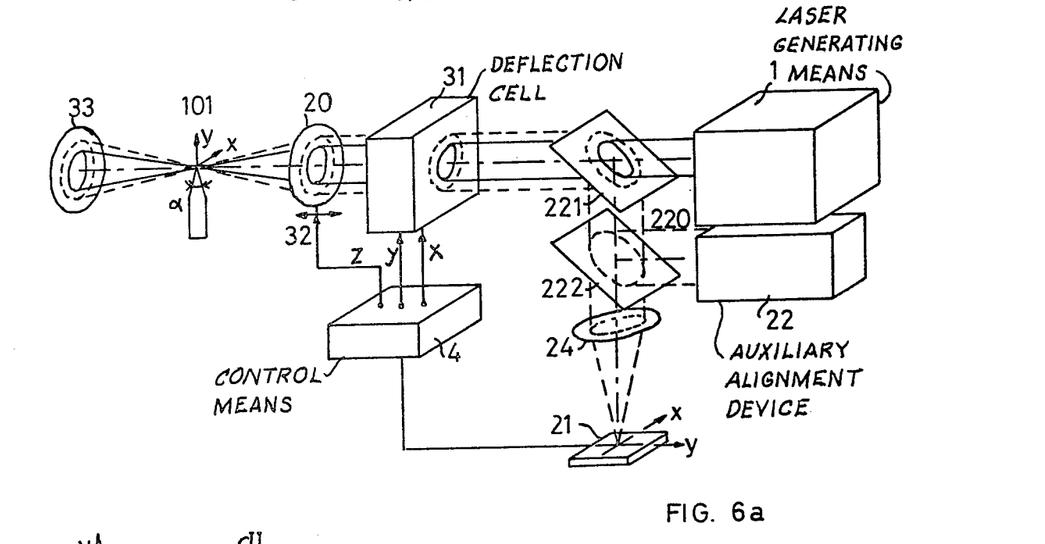

FIG. 6a relates to a variant embodiment of the device according to the invention as shown in FIG. 4. In FIG. 6a the same references represent the same elements as in FIG. 4. According to FIG. 6a, focusing means 3 further comprise a spherical mirror 33 for reflection of treatment laser beam 100 and alignment beam 221. The spherical mirror makes possible the transmission, in the opposite direction along an identical optical path, of the laser beams that are reflected through deflection cell 31.

An auxiliary focusing lens 24 makes possible focusing of the laser beam reflected on detector 21 by means of at least a semitransparent mirror, mirror 221. A second transparent mirror 222 successively makes possible the transmission of the alignment beam to deflection cell 31 and the focusing lens.

The device shown in FIG. 6a functions in a way similar to that described in FIG. 4. The choice of a spherical mirror 33 with a large opening diameter and focal length comparable to that of lens 20, i.e., about the maximal dimension of the instrument to be treated, makes possible a treatment of this object in a way similar to the treatment used by the device according to FIG. 4.

The device according to FIG. 6a, however, is particularly well suited for treating the sharp points of needles of circular section and sharp edges, the heat treatment being symmetrical to the edge. The advantage of the device of FIG. 6a is the simplicity of the positioning detector, the focusing spot of the reflected ray remaining fixed on detector 21.

Any different embodiment in which the detector is placed outside the axis of the incident laser beam acting by reflection, for example, does not go outside the scope of the invention.

Figure 6B:
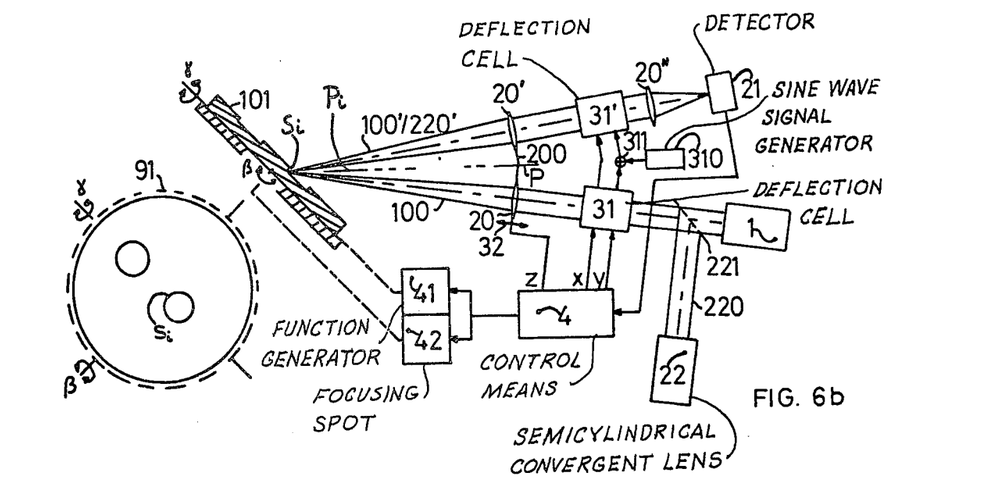

In particular, FIG. 6b represents a particular embodiment of the device used by the process, a device particularly suited to deburring interior angles or grooves of mechanical pieces. According to FIG. 6b, the device according to the invention comprises a system of optical detection of positioning 2 by reflection which further comprises two lens 20' and 20'' making possible image formation of the light spot coming from the focusing spot of laser treatment beam 100 and/or of alignment beam 220 on detector 21, these two beams being reflected by a point or elementary surface Si of an edge to be treated made up of an interior angle, as shown in FIG. 6b, of a mechanical piece 101 carried by instrument piece-holder 91. The two lens 20 and 20' are, in a non-limiting way, mechanically one piece by a structural connection schematized by 200 and preferably arranged symmetrically in relation to a plane of reference P of the mechanical architecture of the device. Plane P, for example, can be the horizontal plane. An auxiliary lens 20'' makes it possible to focus reflected radiation indicated as 100' and 220', transformed into a beam approximately parallel by lens 20' chosen for this purpose, in a non-limiting manner, of the same focal length as lens 20, on detector 21, lens 20″ being able to remain stationary in relation to detector 21. A second deflection cell 31′ is inserted in the path of the reflected radiation, preferably between lens 20′ and 20″ or between lens 20′ and detector 21 in the absence of auxiliary lens 20″. Second deflection cell 31′ is fed, for example, directly parallel with deflection cell 31 in case of use of an auxiliary lens 20″.

The device represented in FIG. 6b functions in a way similar to the device described above. Functioning of the system of focusing on the edge to be treated functioning by reflection, determination of the intersection of the axis of treatment beam 100 and of the edge to be treated cannot be performed by detection of the diffraction spots.

Figure 6C:
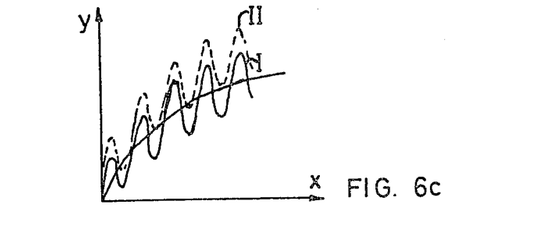

To obtain a satisfactory detection of the focusing, a periodic modulation in direction y and deflection of the reflected radiation beam 100′ or 220′ is performed. For this purpose a sine-wave signal generator, for example 310, makes it possible to superpose on the deflection signal y applied to the second deflection cell 31′ a modulation signal SM by a summing element 311. Detector 21, made up for example of a vidicon tube, further comprises a detection circuit made up, for example, of a standard diode detection circuit making it possible to deliver a continuous signal proportional to the average value of the intensity of the modulated reflected beam representing focusing of the incident beam in relation to the edge to be treated. This continuous signal is delivered by controls means 4. Modulation signal SM has an amplitude causing a deflection at y An and a frequency FM such as AM×FM≧10 Vs, for example. Control means 4 control, considering the program of relative movement of the treatment beam spot at x, y, two auxiliary motors 41 and 42 making possible the orientation at site β and at bearing γ of the supports carrying the instrument or piece and the piece to be treated. Auxiliary motors 41 and 42 make it possible at each instant to assure a suitable orientation of the piece to be treated. Preferably, motors 41 and 42 make it possible to orient bisecting plane Pi of the dihedral angle of the groove or interior edge to be treated at point Si, this plane Pi being kept merger with reference plane P of the architecture of the device. In case of defocusing the spot as shown in FIG. 6c at II, modulation of the deflection at y and of the reflected beam, reflected unsymetrically by the groove, causes detection by detector 21 of a detected signal of non-zero average value and the corresponding correction by control means 4 as described above. The alignment beam can also be offset forward in space in relation to the relative movement of the spot in the case of continuous emission or in time in case of pulsed laser emission, the laser emission being delayed in relation to the emission of the alignment beam generated by an He Ne laser, the two being synchronized, without going outside the scope of the invention.

FIGS. 7a to 7d relate to various types of instruments obtained by use of the process according to the invention. According to FIG. 7a, a sharp instrument 101 with determined angle of sharpening α, subjected to treatment according to the invention, comprises a cutting edge 102 made up of a skew surface of radius of curvature R, fairly uniform in cross section. The zone underlying the edge 103 comprises on the instrument wall a strip of vitrified material of dimension ωo in a first direction parallel to a generatrix G of the instrument wall. The strip of vitrified material has a thickness Zs in a second direction perpendicular to the first direction. The radius of curvature R of the skew surface constituting the edge is of the form $$R = Zs \frac{1}{1 - \sin \frac{\alpha}{2}}.$$

Figure 7A:
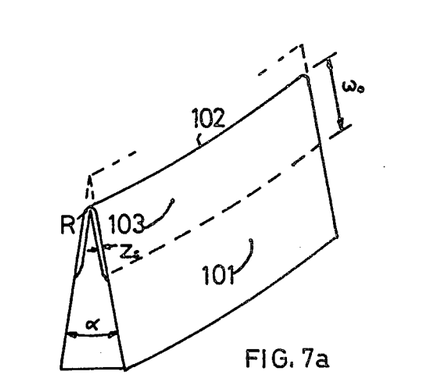

The strip of vitrified material and the skew surface constituting the edge constitute a uniform continuous surface exhibiting a roughness, or grain, close to 1 μm.

Such instruments therefore exhibit a cutting part made up of the edge and vitrified zone free of any burring. The cutting part is thereby made up, because of the phenomenon similar to tempering, described above, of a material with a hardness about three times greater than the hardness of the material constituting the instrument and not subjected to laser treatment.

Figure 7B:
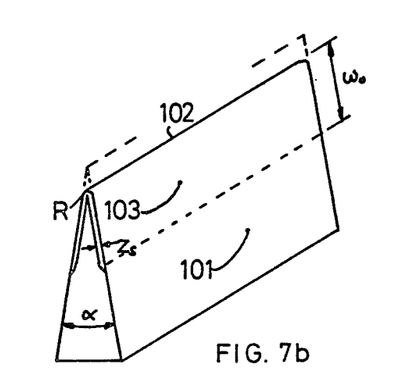

As shown in FIG. 7b, in the case of an instrument of the blade type with a straight edge, the edge as such is made up of a semicylindrical surface. The cross section of the edge is made up of a radius of curvature $$R = Zs \frac{1}{1 - \sin \frac{\alpha}{2}}.$$

Figure 7C:
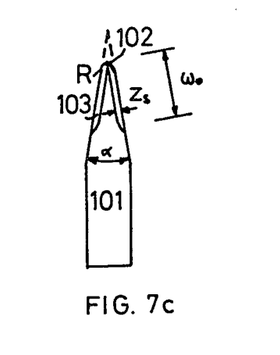

According to a variant embodiment FIG. 7c, the instrument being made up of a needle of fairly circular cross section 104 and the needle point being made up of a cone with an angle of opening approximately equal to the angle of sharpening α of the instrument, the cutting edge 102 of the instrument made up of the needle point is made up of a spherical cap of radius of curvature $$R = Zs \frac{1}{1 - \sin \frac{\alpha}{2}}.$$

The strip of vitrified material 103 forms approximately a truncated cone of dimension ωo in a direction parallel to a generatrix G of the needle wall and of thickness Zs in a direction perpendicular to this direction.

The strip of vitrified material and the spherical cap are continuously connected to form a surface with a roughness close to 1 μm constituting the sharp point of the needle.

Figure 7D:
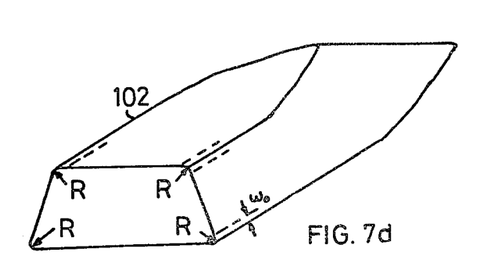

Another variant embodiment is shown in FIG. 7d in the case where the instrument is made up of a needle of the surgical needle type comprising a plurality of sharp edges and a sharp point constituting the edge of the instrument. The sharp edges are, for example, made up of the two-by-two intersection of plane or skew surfaces delimiting a polyhedron. The edge of the instrument is made up, on the one hand, at the sharp edges of an approximately semicylindrical surface 102. The cross section of the edge at these edges is made up of a semicircle of radius R and at the sharp point of a skew surface of the same uniform radius of curvature R of the form $$R = Zs \frac{1}{1 - \sin \frac{\alpha}{2}}.$$

The zone underlying the edge comprises on the instrument wall, on both sides of the edge on each concurrent surface constituting an edge, a strip of vitrified material of dimension ωo in a first direction parallel to a generatrix of the wall or instrument surfaces. The strip of vitrified material has a thickness Zs in a direction perpendicular to this first direction. The strips of vitrified material and the surfaces constituting the edge form a uniform continuous surface exhibiting a roughness or grain close to 1 μm and constitute the cutting part of the instrument.

The surgical needles are of very important interest in use in the field of ophthamological microsurgery and cardiovascular or cosmetic surgery because their local treatment assures them an incomparable cutting precision without the risk of breaking of these needles at a level comparable to that of needles that have undergone, for a similar purpose, an overall treatment such as a heat or other treatment.

I claim:

1. A process for removing metallic burrs from the edge of a sharp instrument comprising, after sharpening the edge of the instrument, focusing on the sharp edge of the instrument, a laser beam of a power density between $10^6$ and $10^8$ W/cm$^2$ I and of intensity, as a function of the distance from the axis of the beam, in a fairly uniform distribution, the axis of the laser beam and the tangent to the instrument edge being approximately concurrent, and moving the focusing spot of the laser beam over the totality of the sharp edge of the instrument at a determined rate of movement to assure the fusion of the metallic burr in the central zone of the laser beam and a vitrification of the surface zones underlying the instrument edge; wherein, to obtain on a sharp instrument comprising a determined angle of sharpening α, a vitrification of a surface zone of the material of the instrument of dimension ωo in a first direction parallel to a generatrix of the instrument wall and of determined thickness Zs in a second direction perpendicular to this first direction, and, a cutting edge made up approximately of a skew surface of determined radius of curvature R, the focusing spot of the laser beam has a diameter 2ωo, the laser radiation being emitted with a candlepower $$Pa = \frac{2\pi\omega o^2 K(Tv - Ts)}{R\left(1 - \sin\frac{\alpha}{2}\right)} \text{ with } R = \frac{Zs}{\left(1 - \sin\frac{\alpha}{2}\right)}$$

and in which K represents the heat conductivity coefficient of the material constituting the instrument, Tv and Ts represent the vaporization temperature and fusion temperature respectively of the material constituting the instrument expressed in degrees centigrade, the movement of said laser beam spot being performed at linear speed Vs of the form $$Vs = \frac{8\omega o H}{\pi R^2 \left(1 - \sin\frac{\alpha}{2}\right)^2} \left(\frac{Tv - Ts}{Tv + 273}\right)^2$$

where H represents the thermal diffusivity coefficient of the material constituting the instrument.

2. A process according to claim 1 wherein the laser radiation is emitted continuously with a candlepower Pa between 10 and 100 W and a power density between $10^6$ and $10^8$ W/cm$^2$, the focusing spot of the laser beam being moved over the totality of the sharp instrument edge at a linear speed between 1 and 100 m/s.

3. A process according to claim 2 wherein the continuous laser emission is modulated by pulses at a modulation frequency on the order of 300 kHz, the average power of the radiation being between 10 and 30 W, each pulse having a duration on the order of 0.3 μs and an energy between 0.03 and 0.1 mJ, the power density of each pulse being close to $5 \times 10^7$ W/cm$^2$ and the speed of relative movement of the focusing spot between 1 and 10 m/s.

4. A process according to claim 1 wherein the laser emission is a pulsed emission of candlepower Pa between 10 and 100 W, the power density of each laser pulse being between $10^6$ and $10^8$ W/cm$^2$, each laser pulse having a duration τ approximately equal to τ=L/Vs of the total length L of the instrument edge at linear speed Vs of relative movement of the focusing spot on this edge, the energy of each pulse being equal to the product Pa×τ.

5. A process according to claim 4 wherein each laser pulse is modulated at a modulation frequency close to 300 kHz, the power density of each modulation pulse being close to $5 \times 10^7$ W/cm$^2$, the speed of movement of the spot on the instrument edge being between 1 and 10 m/s.

6. A process according to claim 1 wherein in the case of a sharp needle type instrument, the laser emission consists of a pulse of power Pa and duration $$\tau = \frac{\pi R^2}{4H}\left(1 - \sin\frac{\alpha}{2}\right)^2 \left(\frac{Tv + 273}{Tv - Ts}\right)^2$$

the focusing spot of the laser beam being kept focused on the needle point for the entire duration of the pulse.

7. A process according to claim 6 wherein the laser emission consists of an energy pulse between 0.03 mJ and 0.1 mJ and duration between 0.3 μs and 10 μs.

8. A process according to claim 1, 2, 3, 4, 5, 6, or 7 wherein the laser emission is performed in TEMoo mode, the intensity of the radiation, as a function of the distance from the axis of the beam, being distributed according to a Gauss curve permitting the volatilization of the burrs and fusion of the zones underlying the sharp edges.

9. A process of making a sharp surgical instrument consisting, starting with a special steel rod, of grinding said rod to form a polyhedral solid comprising a plurality of faces, the two-by-two intersection of said faces forming a sharp edge with a determined sharpening angle α along a plane, continuous line of determined curvature, the group of sharp edges of the polyhedral solid constituting, after sharpening, the instrument edge, subjecting the polyhedral solid unit to a surface treatment permitting a fine polishing of said faces, focusing on at least a point of the sharp edges of the polyhedral solid a laser beam in a focusing spot of diameter 2ωo and of intensity, as a function of the distance in relation to the axis of the beam, that is fairly uniform, the axis of the laser beam of maximal intensity and the tangent to the curve of said sharp edge being approximately concurrent, moving the focusing spot of the laser beam over the totality of the instrument edge, the axis of the laser beam and the tangent to the curve of said sharp edge being kept approximately concurrent during the movement to cause the fusion of the wire edge in the central zone of the laser beam and a fusion of the surface zones underlying the edge, said laser beam making possible, on the one hand, a vitrification of a surface zone of the material of the instrument of dimension ωo in a first direction parallel to a generatrix of the instrument wall and of thickness Zs in a second direction perpendicular to this first direction and, on the other hand, the formation of a cutting edge made up of a skew surface of determined radius of curvature R, of the form $$R = \frac{Zs}{1 - \sin\frac{\alpha}{2}}$$

the laser radiation being emitted with a candlepower $$Pa = \frac{2\pi\omega o^2 K(Tv - Ts)}{R\left(1 - \sin\frac{\alpha}{2}\right)}$$

wherein

K represents the heat conductivity coefficient of the material constituting the instrument, Tv and Ts represent the vaporization temperature and fusion temperature respectively of the material constituting the instrument expressed in degrees centigrade, the movement of the laser beam spot being performed at a linear speed Vs of the form $$Vs = \frac{2\omega o}{T} = \frac{8\omega o\, H}{\pi R^2 \left(1 - \sin\frac{\alpha}{2}\right)^2}\left(\frac{Tv - Ts}{Tv + 273}\right)^2 \text{ where } T$$

represents the duration of the influence of the laser beam on each point of the edges to be treated and where H represents the thermal diffusivity coefficient of the material constituting the instrument.

10. A process according to claim 9 wherein the laser emission is performed in TEMoo mode, the intensity of the radiation as a function of the distance from the axis of the beam being distributed according to a Gauss curve permitting the volatilization of the burrs and fusion of the zones underlying the sharp edges.

* * * * *